United States Patent

[11] 3,609,553

[72] Inventors Marvin J. Frazier
Wood Dale;
Sam Tumarkin, Chicago; Edwin A. Wilson, Chicago; Raymond F. Elsner, Lombard, all of Ill.
[21] Appl. No. 846,091
[22] Filed July 30, 1969
[45] Patented Sept. 28, 1971
[73] Assignee The United States of America as represented by the Secretary of the Navy

[54] DETECTION AND CLASSIFICATION OF NONLINEARLY GENERATED ENVIRONMENT INTERFERENCE SOURCES BY USE OF A VERIFIER SYSTEM
7 Claims, 2 Drawing Figs.

[52] U.S. Cl. 325/67, 325/133, 325/363, 332/46, 332/52
[51] Int. Cl. H04b 1/00
[50] Field of Search 325/67, 65, 363, 133; 332/46, 52; 307/88.3, 200; 324/76, 77

[56] References Cited
UNITED STATES PATENTS
2,678,383 5/1954 Frantz 325/363
3,123,773 3/1964 Vogelman 325/67

*Primary Examiner*—Robert L. Griffin
*Assistant Examiner*—Albert J. Mayer
*Attorneys*—J. C. Warfield, Jr., George J. Rubens and John W. McLaren

ABSTRACT: A method of locating and classifying electromagnetic interference sources in operational electromagnetic environments of communication systems. Interference sources comprising electrical nonlinearities in mechanical junctions of the structural environment of the communications system are excited by electromagnetic radiation at frequency $F_1$ from system transmitters and by induced signals at frequency $F_2$ from a loop probe held in close proximity to the sources to create harmonic and intermodulation product signals. These signals are sensed on system receiving antennas operating in the operational electromagnetic environment. The levels of the sensed signals determine whether the interference sources are interference contributors, noncontributors or localized interference sources, or parasitic elements.

INVENTORS
MARVIN J. FRAZIER
SAM TUMARKIN
EDWIN A. WILSON
RAYMOND F. ELSNER
BY
ATTORNEYS

DETECTION AND CLASSIFICATION OF NONLINEARLY GENERATED ENVIRONMENT INTERFERENCE SOURCES BY USE OF A VERIFIER SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

An interference contributor can be defined as a source of interference signals. Normally, an interference signal is an unwanted signal which masks either partially or completely a desired signal. Where in a system there is no set desired signal, the receivers in the system can be tuned to any channel in the band of interest. Thus, if an intermodulation or harmonic signal is generated in the environment and can be sensed by a system receiver on any channel, it represents a possible interference signal.

If a desired receiver signal were at some future time assigned to the channel occupied by the environment generated signal, it would be a true interference signal. Thus, any nonlinearly generated signal from the environment sensed by a system receiver magnitude it is connected to its associated antenna can be classified as an interference signal. Similarly, an environment nonlinearity is classified as an interference source or contributor if the harmonic or intermodulation signal created in the nonlinearity can be sensed by a system receiver when the nonlinearity is excited by radiations from a system transmitter.

The prior art use of a passive technique for sensing the structural harmonics generated by a radiating system transmitter has several disadvantages. The most important disadvantage is that even though significant third harmonic currents may be flowing in a given structure, no assurance can be had that the particular structure is indeed nonlinear or if it is nonlinear that the currents thus created are actually contributing to the received interference signal.

SUMMARY OF THE INVENTION A method for detecting and classifying electromagnetic interference sources in operational electromagnetic environments of communication systems is disclosed. The method comprises the steps of exciting a suspected electromagnetic nonlinearity with a first fundamental radiation signal from a system transmitter operating at a selectively predetermined frequency $F_1$. The radiation excitation creates in the nonlinearity a third harmonic current at a frequency of $3F_1$. A second fundamental signal at a frequency $F_2$ is induced in the nonlinearity to thereby create in the nonlinearity by a loop probe which is held in close proximity thereto an intermodulation product current at a frequency of $2F_1+F_2$. The amplitude level of the second fundamental signal is adjusted such that the magnitude of the intermodulation current equals the magnitude of the third harmonic current. The intermodulation signal created by the intermodulation currents may be sensed on a system-receiving antenna so that the interference source can be easily classified.

STATEMENT OF THE OBJECTS OF THE INVENTION

An object of the present invention is to provide a method for locating a class of electromagnetic interference sources in complex operational electromagnetic environments of communication systems.

Another object of the present invention is to provide a method which permits distinction between nonlinearities which are interference contributors, noncontributors or localized interference sources, and parasitic elements. Other objects and advantages and novel features of the invention will become apparent from the following detailed description of the invention when considered in conjunction with the accompanying drawing wherein:

DESCRIPTION OF THE PREFERRED EMBODIMENT

Figure 1:
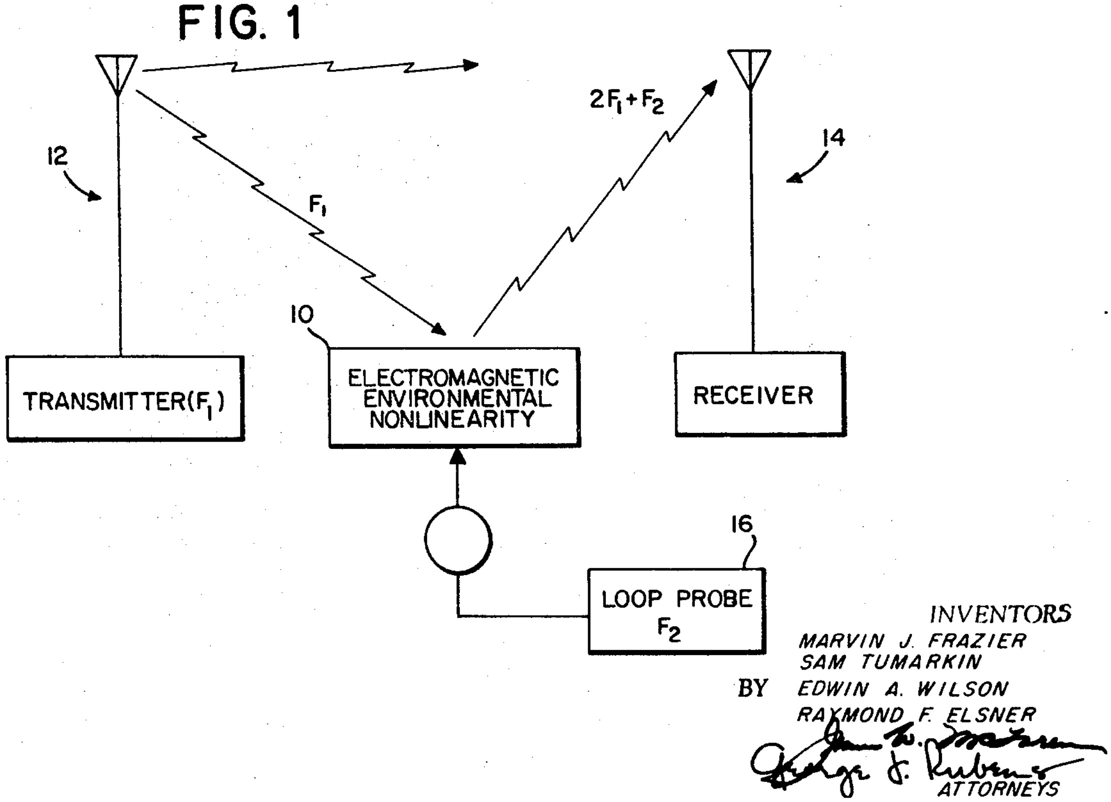
FIG. 1 is a simplified illustration of an operational communications system in which an electromagnetic environmental nonlinearity is creating interference signals.

The present invention comprises a method of locating electromagnetic interference sources in complex operational electromagnetic environments of a communication system as shown in FIG. 1. Interference sources are usually electrical nonlinearities in mechanical junctions of the structural environment. When excited by electromagnetic radiation from system transmitters, these nonlinearities create harmonic and intermodulation product signals that can interfere with receivers operating within the same operational electromagnetic environment.

The radiation from a system transmitter can excite a multiplicity of nonlinearities and thus, the resultant interference signal as sensed by a system receiver, can represent contributory factors from many sources in a complex manner. The purpose of the verifier system of the present invention is to permit the isolation of the interference contribution attributable to a given nonlinearity.

If as shown in FIG. 1, an electromagnetic environmental nonlinearity 10 is excited by radiation from a single-system transmitter 12 operating, for example, at frequency $F_1$, odd-ordered harmonics of the excitation frequency are created by the nonlinearity. In general, the third harmonic has the maximum magnitude, and therefore, it is the signal most readily sensed as interference by the receiving system 14. As stated previously, in a complex operational electromagnetic environment a multiplicity of such nonlinearities are simultaneously excited, and thus the resultant third harmonic interference sensed by the receiving system is the summation of the contributions due to the individual nonlinearities.

Figure 2:
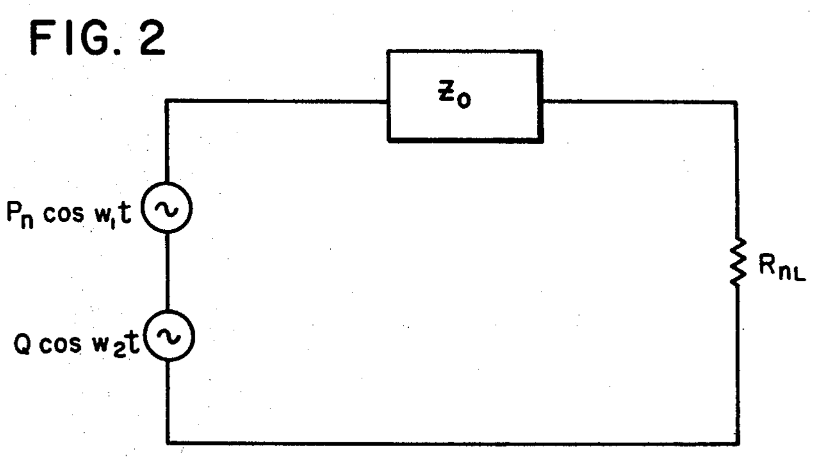
FIG. 2 is a schematic representation of the equivalent circuit of the *n*th electromagnetic nonlinearity excited by two fundamental signals.

If a second fundamental signal at, for example, frequency $F_2$, is induced into one of the nonlinear structure 10 by a conventional loop probe 16 held in close proximity thereto, mixing products between $F_1$ and $F_2$ will also be formed in the nonlinearity. FIG. 2 is a representation of the *n*th electromagnetic nonlinearity excited by a radiated signal at $F_1$ from the transmitter system 12 and by an induced signal at $F_2$ from the loop probe 16. The voltage $P_n \cos w_1 t$ represents the open circuit voltage induced into the structure by the radiating system transmitter at the point of nonlinearity. The voltage $Q \cos w_2 t$ represents the open circuit voltage at the same point which is induced into the same structure by the loop probe 16. $Z_o$ represents the self-impedance of the structure, and $R_{nL}$ is the nonlinear impedance.

Normally the amplitude Q will be of the same order as the amplitude $P_n$. Thus, current at a frequency $F_2$ will flow through the structure impedance $Z_o$ and thus through the radiation resistance of the structure.

However, it can be assumed for purposes of explanation that the energy at frequency $F_2$, which is received by a different structural nonlinearity, for example, the $(n+1)$ structure, is negligible with respect to the signal $P_{n+1} \cos w_1 t$ which is induced into the $(n+1)$ structure by the radiating transmitter. In practice, this condition has been found to be valid for most situations and ensures that the mixing signals sensed by the receiving system are due to only the *n*th nonlinearity.

When the two fundamental signals are applied to the nonlinear structure, a variety of nonlinearly generated frequency terms are created. However, only two are of interest. These are the third harmonics of the system-radiating signal, $3F_1$ and a third order mixing term at frequency $2F_1+F_2$.

In practice, the second fundamental frequency $F_2$ is chosen to be sufficiently close to the radiating fundamental frequency $F_1$ such that the impedances of the circuit of the FIG. 2 are approximately the same at frequency $F_2$ as at $F_1$, and approximately the same at $2F_1+F_2$ as at $3F_1$.

The probe that is used to excite the structure with a signal Q cos $w_2t$ can also be used to sense the currents flowing in the structure at frequencies $3F_1$ and $2F_1 + F_2$. When the level of the amplitude Q of the induced fundamental at frequency $F_2$ is adjusted properly, the amplitude of the intermodulation current can be made to equal that of the third harmonic current. When the magnitudes of the currents at these two frequencies are so adjusted as to be equal, the power radiated by the structure at both frequencies is therefore approximately the same since $3F_1 \approx 2F_1 + F_2$.

Since the power radiated by the nonlinearity 10 at both nonlinearly generated frequencies is the same, the level of the intermodulation signal at $(2F_1 + F_2)$ sensed by the receiving system 14 and its associated antenna is approximately equal to the contribution of the total received third harmonic level attributable to the particular structure under investigation.

The use of the verifier technique as described above allows various suspect structures to be classified according to their interference generating capabilities in the following manner.

First, the suspected structure is excited with a first fundamental radiation signal from a system transmitter 12 operating at a selectively predetermined frequency $F_1$ to thereby create in the structure a third harmonic current at a frequency of $3F_1$. This current can be detected by means of a conventional loop probe 16.

A second fundamental signal at a frequency $F_2$ is then induced by means of a loop probe 16 into the structure. This second signal creates an intermodulation product current in the structure at a frequency of $2F_1 + F_2$. This current can also be detected by means of the loop probe.

The amplitude level of the second fundamental signal is then adjusted to make the magnitude of the intermodulation product current equal to the magnitude of the third harmonic current.

Finally, the level of the intermodulation signal created by the intermodulation product current at $2F_1 + F_2$ is sensed as interference by the of a receiver system 14 which can measure the interference as a received power level or current level on conventional meters (not shown). The power level of the intermodulation received by the system receiver is an indication of the third harmonic or interference contribution of the structure.

If a suspect structure is probed and it is found to be conducting some third harmonic currents of the radiating transmitter, the structure may be easily classified according to its interference generating capabilities.

If a second fundamental signal is induced into a structure conducting third harmonic currents and no intermodulation product current can be sensed on either the probe or the system-receiving antennas, the structure is said to be parasitic. That is, if the level of the intermodulation product current sensed is equal to zero, the structure is acting as a receiving antenna for the third harmonic signal radiated from system transmitters or environment nonlinear structures. Thus, third harmonic currents flow in the structure, but it is not itself nonlinear.

If an intermodulation product current is sensed by the loop probe and its level is greater than zero, the structure under investigation is either a localized interference source or a nonlinear interference contributor.

If after a balance is obtained between the amplitude of the third harmonic currents and the intermodulation product currents, the received power on current level of the intermodulation signal sensed on any of the system-receiving antennas is equal to zero, the structure is said to be a localized interference source. Thus, although the structure is nonlinear and is being excited by a radiating transmitter, the nonlinear products which are radiated from the structure are not coupled efficiently to the system receiver antennas. Usually this condition signifies that the structure under consideration is not a very good antenna.

If after a balance is obtained between the amplitudes of the third harmonic currents and the intermodulation product currents, the level of the intermodulation signal sensed on any one of the system-receiving antennas is greater than zero, the structure is classified as a nonlinear interference contributor. The level of intermodulation received by the system antenna is an indication of the third harmonic or interference contribution of the structure or nonlinearity.

In essence, the procedure described above is termed the verification technique. In practice a small electrostatically shielded loop probe is used to excite the structure with the second fundamental signal $F_2$ and to sense the third harmonic and intermodulation currents flowing in the structure. More coarse location of nonlinear structures can be accomplished by replacing the conventional loop probe by a larger more efficient radiating device.

A second excitation frequency is necessary because the use of a passive technique such as sensing the structural harmonics generated by a radiating system transmitter is not effective. The passive technique is not effective because even though significant, third harmonic currents may be flowing in a given structure, it is not possible to determine whether a particular structure is indeed nonlinear, or if it is nonlinear, that the currents thus created are actually contributing to the received interference level. Although the two excitation frequencies must be chosen to be close together, the second frequency must be different than the radiated frequency in order that an intermodulation product can be formed. If an intermodulation product is not formed. If an intermodulation product is not formed, only harmonics are available, and the harmonic of the second excitation frequency cannot be used due to reasons to be discussed below.

An intermodulation product rather than the third harmonic of the second signal must be monitored for a reason which is subtle but significant. Many of the structures involved are made of steel. Directly beneath the probe used to excite the structures at frequency $F_2$, high circulating currents exist which are different from the $F_2$ currents flowing through the junction nonlinearity. The high circulating currents under the probe create third harmonic circulating currents under the probe due to the nonlinear action of the steel structure itself. These third harmonic currents are sensed by the probe and can give a false indication of the nonlinear contribution due to the junction which is being sought.

When an intermodulation product is sensed, this difficulty is circumvented due to the fact that the fundamental current at $F_1$ that is induced in the structure by the radiating system transmitter is, in general, not of sufficient magnitude to intermodulate in the steel with the $F_2$ currents circulating under the probe. Thus, the intermodulation currents that are sensed are due entirely to mixing in the junction nonlinearity.

When $F_1$ and $F_2$ are chosen to be nearly equal, there exist two third-order intermodulation product currents approximately equal in frequency to $3F_1$. These currents have frequencies $(2F_1 + F_2)$ and $(2F_2 + F_1)$ respectively. The object of the verification technique is to make the level of the intermodulation current equal to the third harmonic current at $3F_1$ by adjusting the level of the $F_2$ fundamental signal induced into the structure.

Analysis of the circuit shown in FIG. 2 shows that for the intermodulation product current at frequency $(2F_1 + F_2)$ to be equal to the current at $3F_1$, the magnitude of the induced signal Q cos $W_2t$ is less than is required for the intermodulation product current at $(2F_2 + F_1)$ to be equal to the current at $3F_1$. This fact is in itself not of great significance; however, it can also be shown that the level of the third harmonic signal at $3F_1$ is also dependent on the level of the second applied signal Q cos $W_2t$.

Application of the second fundamental signal causes a decrease in the amplitude level of the third harmonic, $3F_1$ of the radiated fundamental $F_1$. It is desirable, therefore, to keep the required magnitude of the second fundamental to a minimum value in order for the third harmonic level at balance to be approximately equal to the level that exists prior to the application of the second fundamental. Thus, it is more desirable to force the magnitude of the $(2F_1 + F_2)$ signal rather than the $(2F_2+F_1)$signal to be equal to the magnitude of the $3F_1$ signal.

The capabilities of the verifier technique can be fully utilized by means of conventional apparatus. That is normally, the receivers and transmitters required for the operation of the verifier technique are parts of a typical communications system complex.

As previously discussed, the loop probe which is used to excite a structure with a second fundamental signal is likewise a conventional component. Several features are desirable, however, in the instrumentation to facilitate junction location by the verifier technique. First, the actual probing operation should be capable of being performed by one operator. Second, the instrumentation should provide the operator probing the structures a direct readout indication of the signal levels of the third harmonic currents, the intermodulation product currents, and the intermodulation signals. Finally, the operator should have control of the amplitude level of the $F_2$ fundamental signal induced into the structure so that the previously described balance can be accomplished.

From an understanding of the description of the foregoing disclosed embodiment of the present invention, it will be readily appreciated that a novel method of detecting interference sources which are electrical nonlinearities in mechanical junctions of the structural environment has been disclosed. The nonlinearities when excited by electromagnetic radiation from system transmitters create harmonic and intermodulation product signals which in turn can interfere with receivers operating within the same local environment. By using the method of the present invention, various structures and environment can be classified as to their interference potential. Based on the probing results appropriate steps can be taken to eliminate the located structure nonlinearities and to thus reduce the overall environment generated interference level.

What is claimed is:

1. A method for locating and classifying electromagnetic interference sources in the operational electromagnetic environments of communication systems comprising the steps of:

1. exciting a suspected electromagnetic nonlinearity with a first fundamental radiation signal from a system transmitter operating at a selectively predetermined frequency $F_1$ to thereby create in said nonlinearity a third harmonic current at a frequency of $3F_1$;
2. exciting said nonlinearity with a second fundamental signal at a frequency $F_2$ from a loop probe held in close proximity to said nonlinearity to thereby create in said nonlinearity an intermodulation product current at a frequency of $2F_1+F_2$;
3. adjusting the amplitude level of said second fundamental signal to make the magnitude of said intermodulation product current equal to the magnitude of said third harmonic current; and
4. sensing by means of a system receiver and its associated antenna the received power level of the intermodulation signal created by said intermodulation product current, said received power level being an indication of the interference contribution of said nonlinearity.

2. The method of claim 1 wherein a sensed level of said intermodulation signal greater than zero, indicates that said nonlinearity comprises an interference contributor.

3. The method of claim 1 wherein a sensed level of said intermodulation signal equal to zero, indicates that said nonlinearity comprises a localized interference source.

4. A method for classifying structural third harmonic currents generated by radiated signals from communications system transmitters in the operational electromagnetic environment of the communications system comprising the steps of:

1. inducing a signal in an electromagnetic nonlinearity having third harmonic currents flowing therein, said signal being induced by means of a loop probe held in close proximity to said nonlinearity and having a frequency different from the operating frequency of said system transmitters;
2. sensing by means of said loop probe the current level of the intermodulation product current created in said nonlinearity by said radiated signals and the induced signal;
3. adjusting the amplitude level of said induced signal to make the magnitude of said intermodulation current equal to the magnitude of said third harmonic current; and
4. sensing on a system receiver and its associated antenna the received power level of the intermodulation signal 5. The method of claim 4 wherein a sensed current level of said intermodulation product current sensed by said loop probe equal to zero, indicates that said structure constitutes a parasitic structure.

6. The method of claim 4 wherein a sensed current level of said intermodulation product current sensed by said loop probe greater than zero and a sensed received power level of said intermodulation signal sensed by said system receiver and its associated antenna equal to zero, indicates that said structure constitutes a localized interference source.

7. The method of claim 4 wherein a sensed current level of said intermodulation product current sensed by said loop probe and a sensed received power level of said intermodulation signal sensed by said system receiver and its associated antenna greater than zero, indicates that said structure constitutes a nonlinear interference contributor.